(12) United States Patent
Chou et al.

(10) Patent No.: US 8,976,132 B2
(45) Date of Patent: Mar. 10, 2015

(54) TOUCH-SENSING DISPLAY APPARATUS

(75) Inventors: Jiann-Liang Chou, New Taipei (TW); Chen-Hao Su, Taichung (TW)

(73) Assignees: Wintek (China) Technology Ltd., Guangdong Province (CN); Wintek Corporation, Taichung (TW)

( * ) Notice: Subject to any disclaimer, the term of this patent is extended or adjusted under 35 U.S.C. 154(b) by 410 days.

(21) Appl. No.: 13/555,197

(22) Filed: Jul. 23, 2012

(65) Prior Publication Data

US 2013/0176235 A1     Jul. 11, 2013

(30) Foreign Application Priority Data

Jan. 6, 2012   (TW) .............................. 101100652 A (51) Int. Cl.
    *G06F 3/041*     (2006.01)
    *G06F 3/045*     (2006.01)
    *G02F 1/1335*     (2006.01)

(52) U.S. Cl.
    CPC .... *G06F 3/0412* (2013.01); *G06F 2203/04103* (2013.01)
    USPC .............................. 345/173; 345/174; 349/12

(58) Field of Classification Search
    CPC ...... G06F 3/041; G06F 3/0412; G06F 3/0414
    USPC ................................................. 345/173–178
    See application file for complete search history.

(56) References Cited

U.S. PATENT DOCUMENTS

| | | | | |
|---|---|---|---|---|
| 4,894,698 | A * | 1/1990 | Hijikigawa et al. | 257/254 |
| 8,654,267 | B2 * | 2/2014 | Fujioka et al. | 349/12 |
| 2009/0051644 | A1 * | 2/2009 | Shih et al. | 345/104 |
| 2009/0109186 | A1 * | 4/2009 | Pan et al. | 345/173 |
| 2009/0115741 | A1 * | 5/2009 | Wang et al. | 345/173 |
| 2010/0238122 | A1 * | 9/2010 | Chang et al. | 345/173 |
| 2012/0105347 | A1 * | 5/2012 | Pak | 345/173 |

* cited by examiner

*Primary Examiner* — Kathy Wang-Hurst
*Assistant Examiner* — David Tung
(74) *Attorney, Agent, or Firm* — Jianq Chyun IP Office (57) ABSTRACT

A touch-sensing display apparatus includes a first substrate, a second substrate, a plurality of touch sensing structures, and a display medium. The first substrate has a plurality of pixels and scan lines, and a read-out line. Each touch sensing structure includes a sensing active device, a sensing space, and a bridge electrode. Each sensing active device is disposed on the first substrate and includes a bottom gate, a channel, a source, a sensing electrode, and a top gate. The top gate has an opening to form a first electrode and a second electrode that are electrically isolated. When pressed, the bridge electrode contacts the top gate to electrically connect to the first and second electrodes, so that control of the channel is transformed from one of the top gate and the bottom gate to both the top and the bottom gates, thereby forming a sensing current in the sensing electrode.

13 Claims, 6 Drawing Sheets

TOUCH-SENSING DISPLAY APPARATUS

CROSS-REFERENCE TO RELATED APPLICATION

This application claims the priority benefit of Taiwan application serial no. 101100652, filed on Jan. 6, 2012. The entirety of the above-mentioned patent application is hereby incorporated by reference herein and made a part of this specification.

BACKGROUND OF THE INVENTION

1. Technical Field

The invention relates generally to an electronic apparatus, and more particularly to an integrated touch-sensing apparatus and a touch-sensing display apparatus.

2. Related Art

Generally speaking, in a touch-sensing display panel, a touch-sensing panel is attached above a display panel so as to enable touch-sensing and display functions for the touch-sensing display panel. The touch-sensing panel typically includes a plurality of first sensing series extended along a X-axis direction, and a plurality of second sensing series extended along a Y-axis direction, in which each of the first sensing series and each of the second sensing series respectively has a plurality of sensing pads connected in series. When a finger touches the touch-sensing panel, the capacitance between the sensing pads changes, and this change signal is fed back to the controller for the calculation of the touch point coordinate. Accordingly, the display frame can be varied by the display panel according to the user selection.

However, the touch-sensing panel and the display panel respectively have substrates carrying their respective devices. Therefore, even though a touch-sensing display panel with touch-sensing and display functions is formed after attaching the touch-sensing panel to the display panel, the panel's overall thickness cannot be effectively reduced. Accordingly, the consumer's demand for thin and compact electronic products cannot be satisfied. Moreover, with these conventional technologies, because light must pass through a plurality of substrates for display, the overall light transmission rate of the touch-sensing display panel is reduced.

SUMMARY OF THE INVENTION

The invention provides a touch-sensing display apparatus capable of integrating functions of cover panel, touch sensing, and display, and capable of reducing the overall thickness and enhancing the light transmission rate.

The invention provides a touch-sensing display apparatus, including a first substrate, a second substrate, a plurality of touch sensing structures, and a display medium. The display medium is disposed between the first substrate and the second substrate. The first substrate has a plurality of pixels arranged in array, a plurality of scan lines, and at least a read-out line. The second substrate is disposed opposite to the first substrate. The plurality of touch sensing structures are disposed between the first substrate and the second substrate, and each of the touch sensing structures is disposed in one of M×N pixels, M and N are positive integers, each of the touch sensing structures includes a sensing active device, a sensing spacer, and a bridge electrode. The sensing active device is disposed on the first substrate, and the sensing active device includes a bottom gate, a channel, a source, a sensing electrode, and a top gate. The top gate and the bottom gate are respectively disposed on a top surface and a bottom surface of the channel. The source and the sensing electrode are disposed between the top gate and the channel and respectively located on two sides of the channel. The top gate has an opening to form a first electrode and a second electrode that are electrically isolated. The first electrode is electrically connected to at least one of the scan lines, and the sensing electrode is electrically connected to the read-out line. The sensing spacer is disposed on the second substrate and located above the opening. The bridge electrode covers a surface of the sensing spacer facing the sensing active device, in which a spacing exists between the bridge electrode and the top gate. When the touch-sensing display apparatus is pressed, the bridge electrode contacts the top gate to electrically connect the first electrode with the second electrode, so that control of the channel is transformed from one of the top gate and the bottom gate to both of the top gate and the bottom gate, and a sensing current is formed in the sensing electrode.

In summary, the touch-sensing display apparatus in some embodiments of the invention directly fabricates the touch sensing device on the active device array substrate of the display panel and the color filter substrate, and by changing the number of gates for controlling the channel switching in the sensing active device before and after touch, the voltage and current characteristic curve of the sensing active device is altered. Accordingly, the sensing electrode can detect the turn on or turn off current difference (sensing current) formed before and after the touch sensing structures is pressed. In other words, the touch sensing device can be integrated in the display panel used for display, thereby achieving a thin touch-sensing display apparatus integrating touch sensing and display functions.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
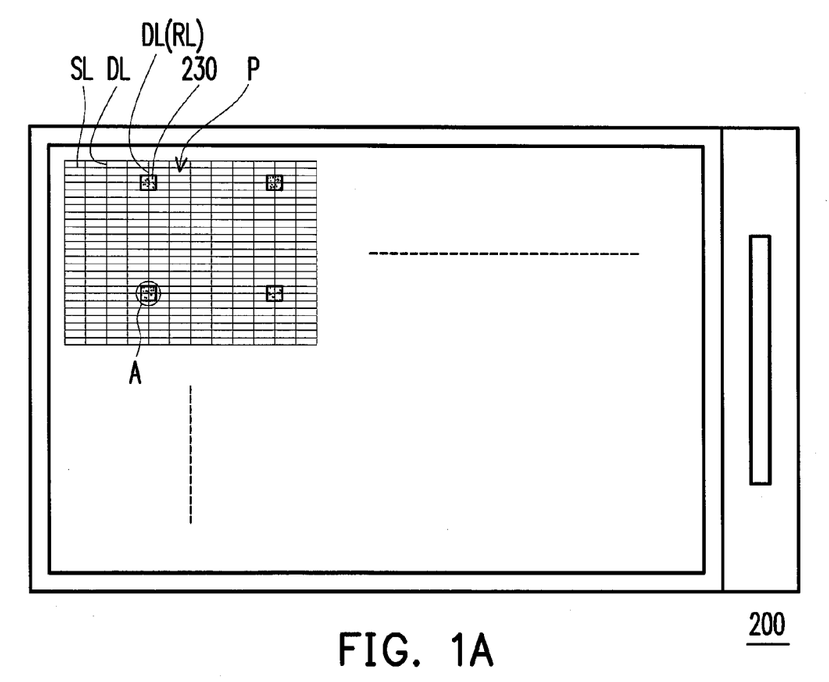
FIGS. 1A and 1B are respective schematic top views of a touch-sensing display apparatus according to a first embodiment of the invention.
Figure 2A:
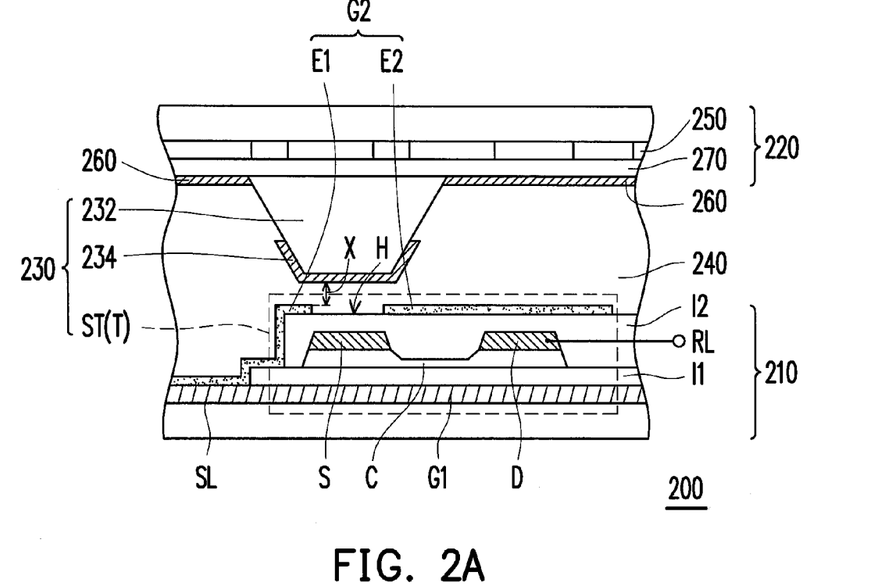
FIG. 2A is a schematic cross-sectional view of an enlarged area A in FIG. 1A.

FIG. 1A is a schematic top view of a touch-sensing display apparatus according to a first embodiment of the invention, and FIG. 2A is a schematic cross-sectional view of an enlarged area A in FIG. 1A. As shown in FIGS. 1A and 2A, a touch-sensing display apparatus 200 includes a first substrate 210, a second substrate 220 disposed opposite to the first substrate 210, a plurality of touch sensing structures 230 disposed between the two substrates 210 and 220, and a display medium 240. The display medium includes liquid crystal molecules or other suitable display mediums.

Figure 1B:
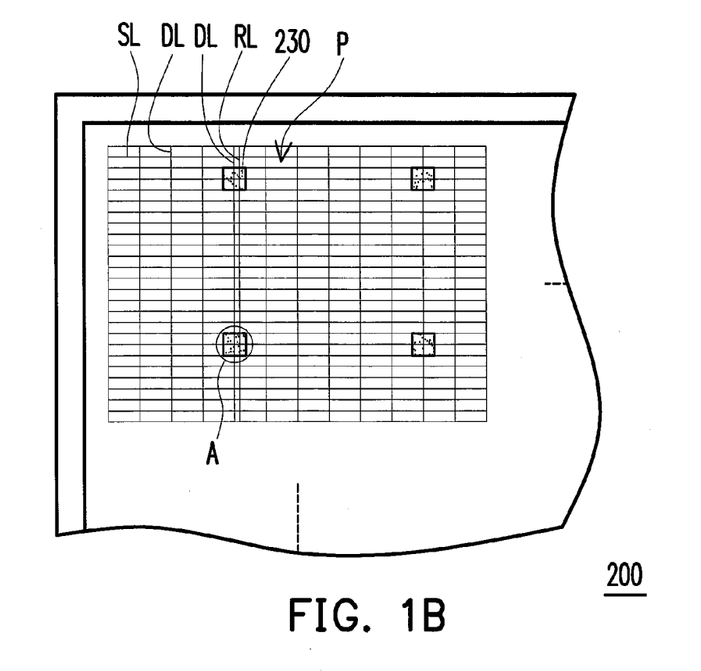

In the present embodiment, the first substrate 210 is an active device array substrate having a plurality of pixels P arranged in array, a plurality of scan lines SL, a plurality of data lines DL, and at least a read-out line RL disposed thereon. Specifically, each of the pixels P may include an active device T and a pixel electrode (not drawn) electrically connected thereto, in which each active device T is electrically connected to the corresponding scan line SL and data line DL. The active device T electrically connected to the pixel electrode (not drawn) may be, for example, a thin film transistor having a gate, a channel, a source, and a drain. In the present embodiment, the data lines DL and the read-out line RL may be integrated into a same trace. The data lines DL and the read-out line RL may be configured as shown in FIG. 1B, in which the read-out lines RL are independently and additionally configured on a touch-sensing location different from the data lines DL, although the invention is not limited thereto.

In particular, as shown in FIG. 1A, a touch sensing structure 230 is respectively disposed in M×N pixels for sensing and detecting a touch location from a user, in which M and N are positive integers. As shown in FIG. 2A, each of the touch sensing structures 230 includes a sensing active device ST disposed on the first substrate 210, and a sensing spacer 232 and a bridge electrode 234 disposed on the corresponding second substrate 220. The sensing active device ST in the touch sensing structures 230 may be directly used in common with the active device T for display. The active device T may also be separately configured on the original pixels.

Specifically, the sensing active device ST may include a bottom gate G1, a gate insulating layer I1, a channel C, a source S, a sensing electrode D, a dielectric layer I2, and a top gate G2. The bottom gate G1 is disposed on the substrate, the channel C is disposed on the gate insulating layer I1 above the bottom gate G1, the dielectric layer I2 covers the source S and the sensing electrode D, and the top gate G2 covers the dielectric layer I2. Since the drain in a typical active device serves as the sensing electrode D, the source S and the sensing electrode D disposed on two sides of the channel C are sandwiched between the top gate G2 and the channel C. The top gate G2 has an opening H to form a first electrode E1 and a second electrode E2 that are separated and electrically isolated before the touch sensing structures 230 is pressed. The first electrode E1 is electrically connected to at least one of the scan lines SL, and the sensing electrode D is electrically connected to the read-out line RL. The opening H of the top gate G2 partially overlaps the channel C on a projection direction of the substrate. The bottom gate G1 extends below the channel C from the scan lines SL. In other words, both the first electrode E1 and the bottom electrode G1 of the present embodiment are electrically connected to the scan lines SL.

In the present embodiment, the second substrate 220 includes a color filter layer 250, a common electrode 260, and a planar layer 270. The common electrode 260 covers the color filter layer 250, the planar layer 270 covers a surface of the color filter layer 250 and is sandwiched between the common electrode 260 and the color filter layer 250. However, the planar layer 270 is not an essential structure and may be disposed on the second substrate 220 or not. A material of the bridge electrode 234 may be the same as a material of the common electrode 260 and may be the same layer and fabricated at the same time. The sensing spacer 232 and the common electrode 260 may be disclosed on the planar layer 270 or the color filter layer 250. The sensing spacer 232 is disposed on the second substrate 220 at an area corresponding to the opening H. The bridge electrode 234 covers a surface of the sensing spacer 232 facing the sensing active device ST. That is to say, an opposite side of each sensing spacer 232 is precisely disposed above the opening H of the top gate G2 of the sensing active device ST in the projection direction of the substrate.

A spacing X exists between a surface of the bridge electrode 234 on the sensing spacer 232 and a surface of the top gate G2 on the sensing active device ST, so that each sensing spacer 232, bridge electrode 234, and sensing active device ST form a touch sensing structure 230.

Figure 2B:
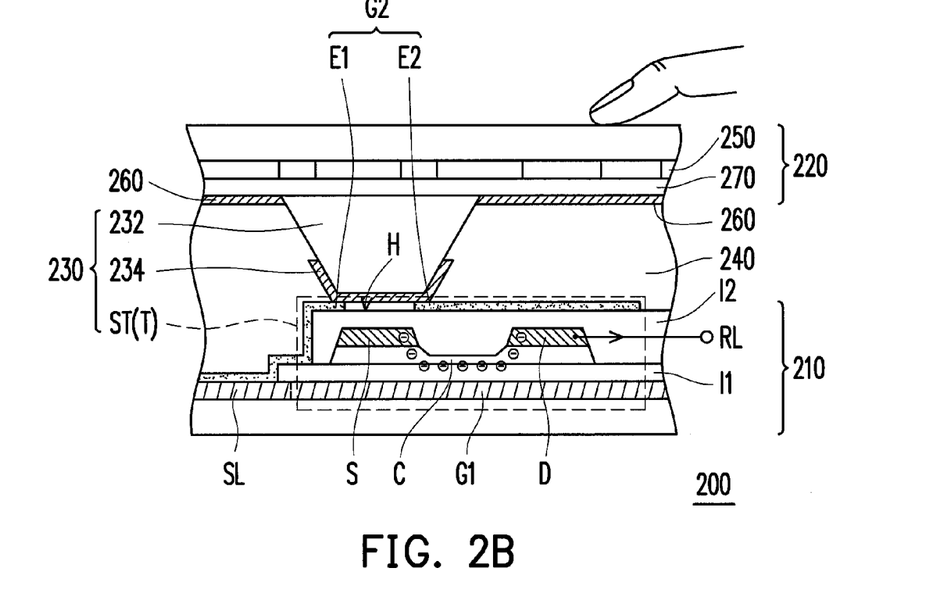
FIG. 2B is a schematic cross-sectional view of the touch-sensing display apparatus depicted in FIG. 2A after being pressed.
Figure 3:
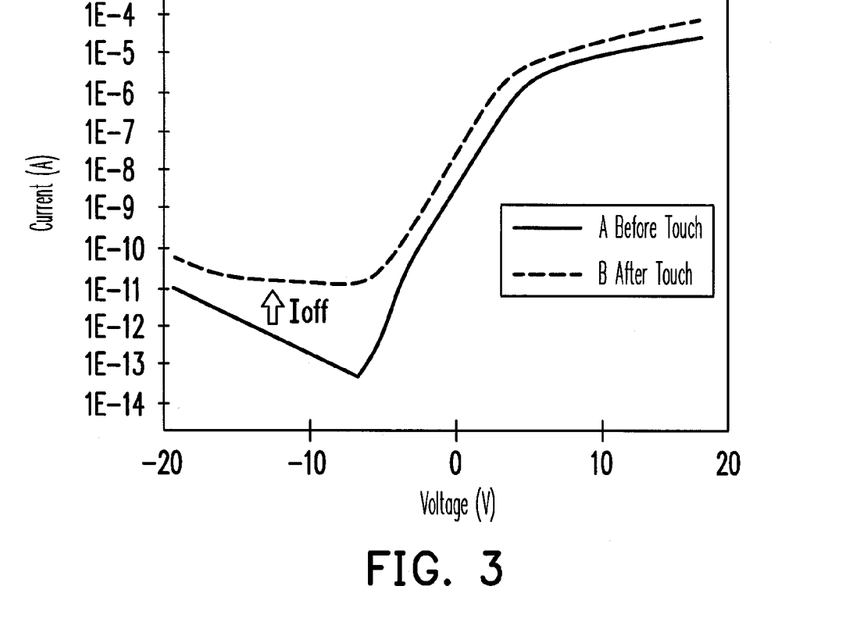
FIG. 3 is a voltage and current characteristics curve diagram before and after the touch-sensing display apparatus depicted in FIGS. 2A and 2B is pressed.

FIG. 2B is a schematic cross-sectional view of the touch-sensing display apparatus depicted in FIG. 2A after being pressed. As shown in FIGS. 2A and 2B, before a press, a carrier quantity in the channel C of the sensing active device ST is only controlled by the bottom gate G1. When the touch-sensing display apparatus 200 is pressed, the spacing X gradually decreases to zero so the bridge electrode 234 on a surface of the sensing spacer 232 contacts the top gate G2 on the opposite side. Moreover, the first electrode E1 and the second electrode E2 are electrically conductive to form a complete top gate G2 crossing the channel C. Therefore, the channel C is not only controlled by the bottom gate G1 but also controlled by the top gate G2. Since control of the channel C of the sensing active device ST is transformed from the bottom gate G1 before the touch to both of the top gate G2 and the bottom gate G1 after the touch, a sensing current Is is formed in the sensing electrode D. FIG. 3 is a voltage and current characteristics curve diagram before and after the touch-sensing display apparatus depicted in FIGS. 2A and 2B is pressed. A voltage and current characteristic curve of the sensing active device ST before and after a user press is formed by a curve A and a curve B. After the user touch, a turn off current of the sensing active device ST rises. Accordingly, the sensing electrode D may sense a difference value $\Delta$Ion of the turn off current and thereby determine a touch position.

Figure 4:
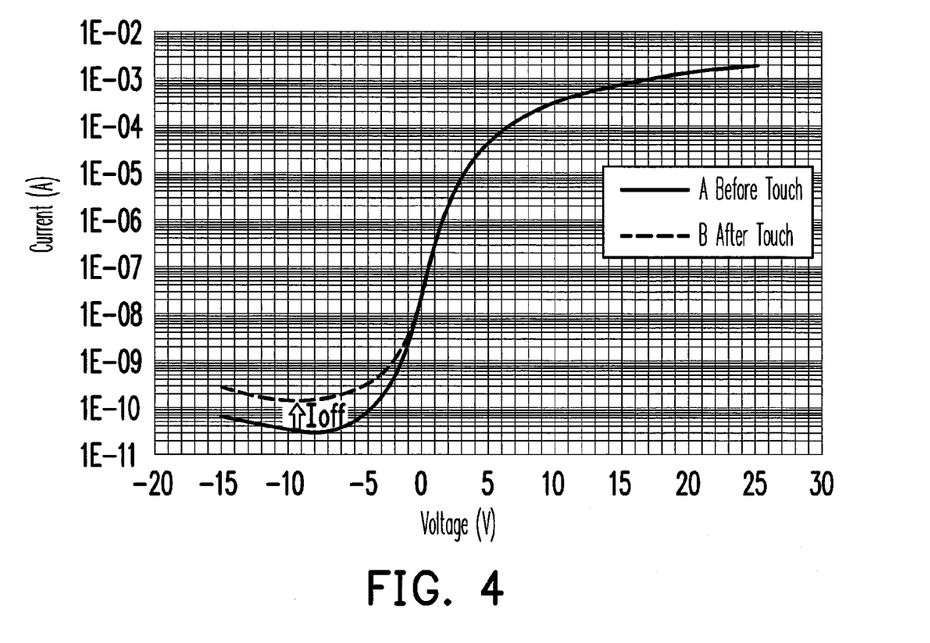
FIG. 4 depicts experimental measured values of a voltage and current characteristics curve before and after the sensing active device is touched according to the first embodiment of the invention.

FIG. 4 depicts experimental measured values of a voltage and current characteristics curve before and after the sensing active device is touched according to the first embodiment of the invention. As shown in FIG. 4, control of the sensing active device ST is transformed from the bottom gate G1 before the touch to both of the bottom gate G1 and the top gate G2. Moreover, as seen in FIG. 4, the turn off current of the sensing active device ST increases by approximately 0.0394 nA after the touch. Therefore, the sensing electrode D may view the turn off current difference $\Delta$Ioff as the sensing current Is for transmission out to a controller by the read-out line RL. By calculating and feeding back a touch coordinate to the display panel, the display frame can be varied according to the user selection. Moreover, in the first embodiment, the channel of the sensing active device ST is transformed from a single lower channel before the touch to dual upper and lower channels after the touch. In an actual fabrication process, since the upper channel has more interface defects after etching, therefore, the addition of the upper channel after the touch results in the clear increase of the turn off current Ioff. It should be noted that, the magnitude of the turn off current Ioff for the transistors in FIGS. 3 and 4 is directly related to the design of a ratio of channel width to length (W/L), besides being related to the operating voltage and fabrication capabilities.

In the present embodiment, the sensing active device ST in the touch sensing structures 230 may be directly used in common with the active device T for display. Therefore, when the data lines DL and the read-out line RL use the same common trace, in actual operation, timing control may be employed to differentiate a timing for writing a display signal into the active device T and a sensing timing for sensing the touch location. Accordingly, conflicts between the operation of the display unit and the touch sensing unit can be prevented. It should be apparent that, the sensing active device ST in the touch sensing structures 230 of the present embodiment may also be different from the active device T for display. In other words, the sensing active device ST realizing a sensing function and the active device T realizing a display function are electrically isolated from each other and disposed in the corresponding pixels P, although the invention is not limited thereto.

Figure 5A:
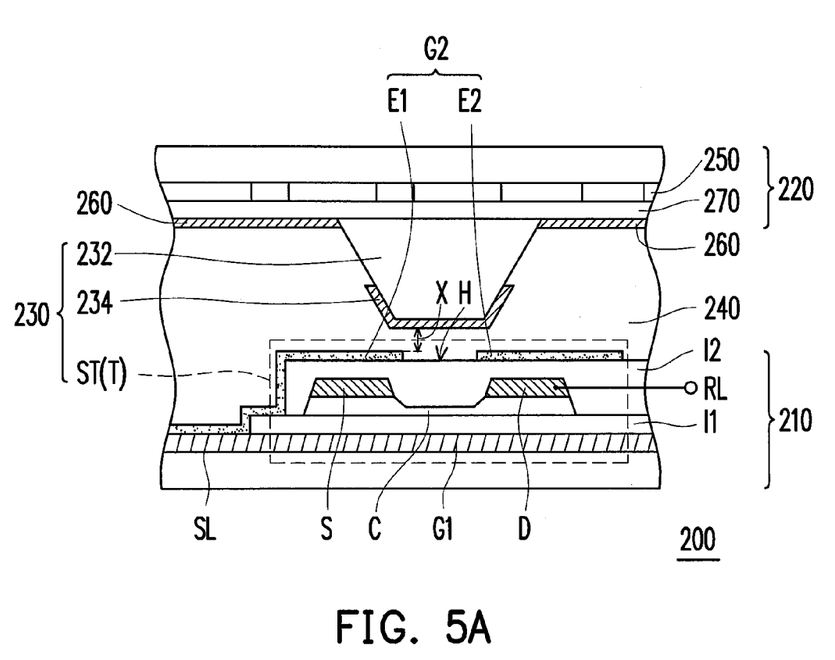
FIGS. 5A and 5B are respective schematic cross-sectional views of another touch-sensing display apparatus according to the first embodiment of the invention.
Figure 5B:
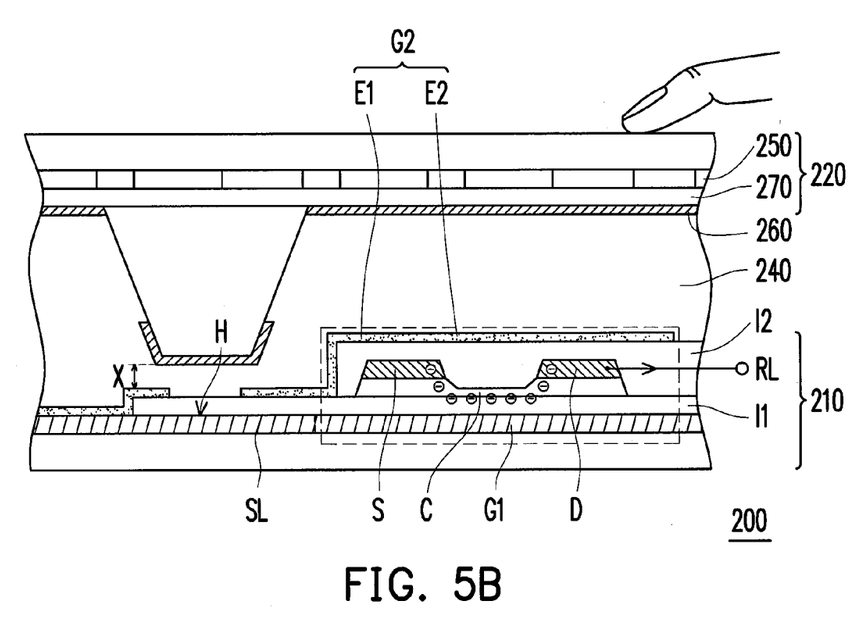

Moreover, besides the location of the opening H of the top gate G2 partially overlapping the channel C on the projection direction of the substrate as shown in FIG. 2A, configurations in FIGS. 5A and 5B may also be adopted. As shown in FIG. 5A, the opening H of the top gate G2 may be located right above the projection of the channel C. When the opening H of the top gate G2 is configured on the projection direction of the substrate as shown in FIG. 2A or in FIG. 5A, an effective aperture ratio of the display unit can be maintained. However, the location of the opening H of the top gate G2 may also be configured as in FIG. 5B, so as to not overlap the channel C on the projection direction of the substrate.

Second Embodiment

Figure 6A:
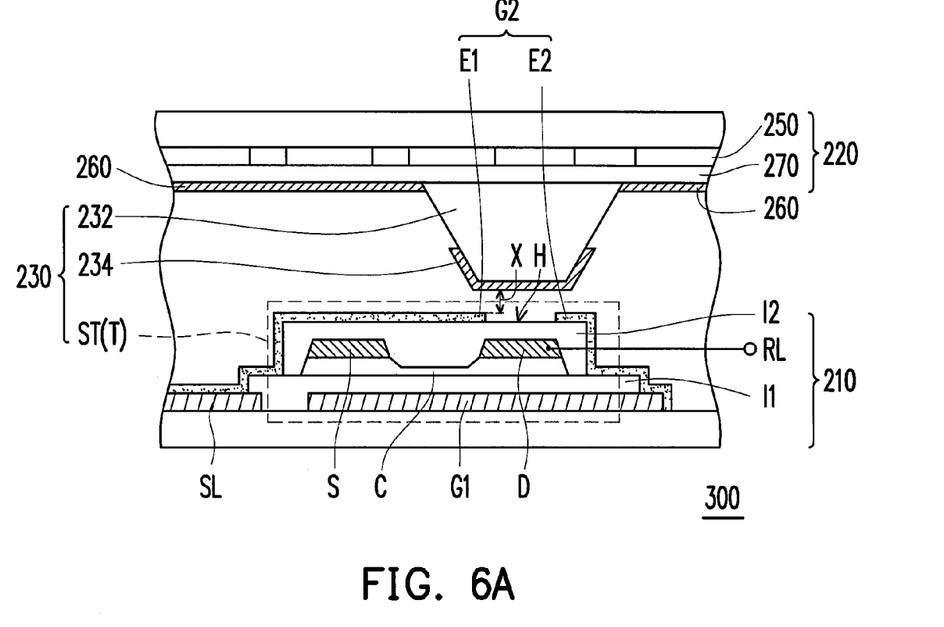
FIG. 6A is another schematic cross-sectional view of the enlarged area A in FIG. 1A.
Figure 6B:
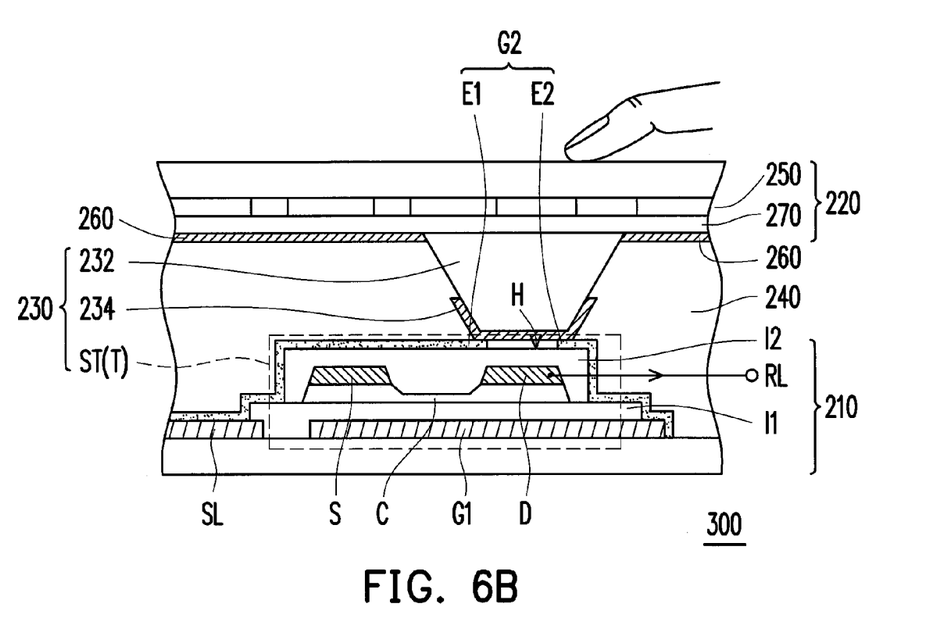
FIG. 6B is a schematic cross-sectional view of the touch-sensing display apparatus depicted in FIG. 6A after being pressed.

FIG. 6A is another schematic cross-sectional view of the enlarged area A in FIG. 1A, and FIG. 6B is a schematic cross-sectional view of the touch-sensing display apparatus depicted in FIG. 6A after being pressed. A touch-sensing display apparatus 300 of the second embodiment is similar to the touch-sensing display apparatus 200 of the first embodiment. However, in the present embodiment, the sensing active device ST in the touch-sensing display apparatus 300 is controlled by only the the first electrode E1 of the top gate G2 before the touch. After the touch, control is transformed to both the top gate G2 and the bottom gate G1.

In the present embodiment, the opening H of the top gate G2 partially overlaps the channel C on the projection direction of the first substrate, but is not limited to being centered or shifted to the sides. In order to avoid affecting the aperture ratio of the display unit, it may be necessary that the opening H not overlap with the channel C of the sensing active device ST. Moreover, the bottom gate G1 is below the channel C but not electrically connected to the scan lines SL, and only the first electrode E1 is electrically connected to the scan lines SL. In other words, the bottom gate G1 is not directly electrically connected to the scan lines SL but is electrically connected to the second electrode E2. As shown in FIGS. 6A and 6B, before a press, a carrier quantity in the channel C of the sensing active device ST is only controlled by the first electrode E1 (top gate G2) crossing above the channel C and electrically connected to the scan lines SL. After the touch-sensing display apparatus 300 is pressed, the bridge electrode 234 on the surface of the sensing spacer 232 contacts the top gate G2 on the opposite side. Moreover, the first electrode E1, the second electrode E2, and the bottom gate G1 are electrically conductive, and accordingly a scanning signal of the scan lines SL is transmitted to the bottom gate G1 via the first electrode E1, the bridge electrode 234, and the second electrode E2. Therefore, control of the channel C of the sensing active device ST is transformed from the top gate G2 before the touch to both the top gate G2 and the bottom gate G1 after the touch.

Figure 7:
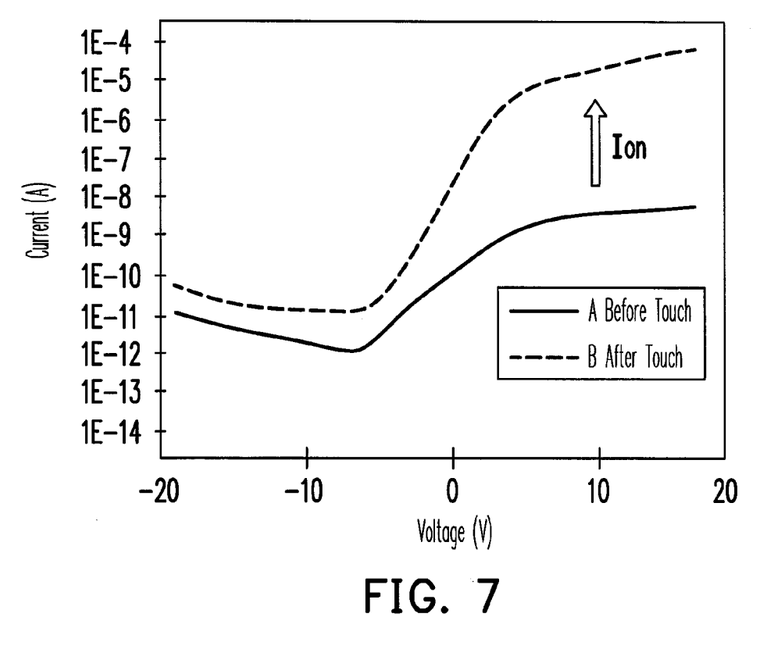
FIG. 7 is a voltage and current characteristics curve diagram before and after the touch-sensing display apparatus depicted in FIGS. 6A and 6B is pressed.

FIG. 7 illustrates a voltage and current characteristics curve diagram of the touch-sensing display apparatus 300 depicted in FIGS. 6A and 6B after being pressed. Similarly, as shown in FIG. 7, after the user touch, a turn on current of the sensing active device ST increases from the curve A to the curve B. Accordingly, the sensing electrode D may sense a difference value $\Delta$Ion of the turn on current before and after the touch and thereby determine a touch position.

Figure 8:
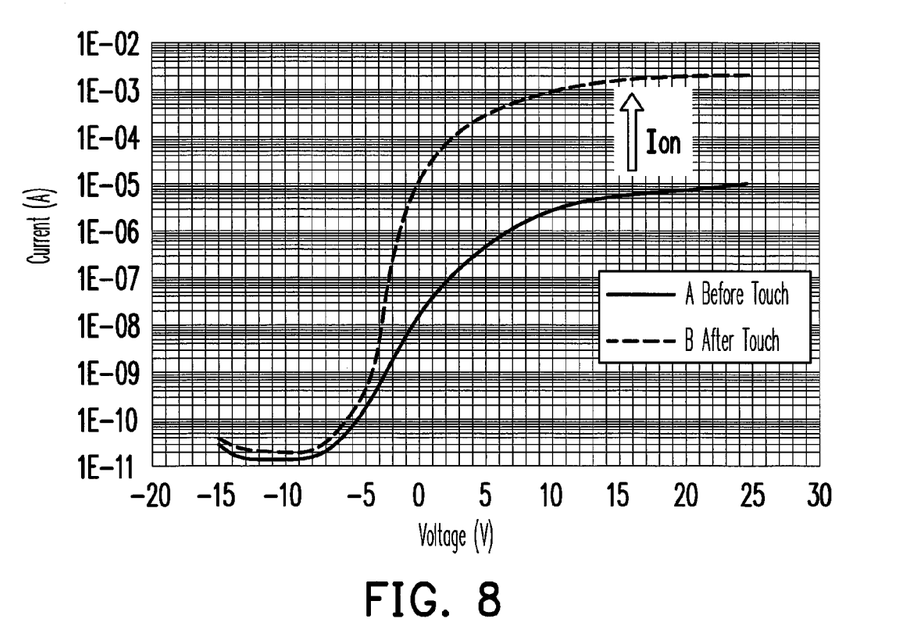
FIG. 8 depicts experimental measured values of a voltage and current characteristics curve before and after the sensing active device is touched according to a second embodiment of the invention.

FIG. 8 depicts experimental measured values of a voltage and current characteristics curve before and after the sensing active device is touched according to the second embodiment of the invention. As shown in FIG. 8, control of the sensing active device ST is transformed from the first electrode E1 of the top gate G2 before the touch to both of the bottom gate G1 and the top gate G2. Moreover, the turn on current of the sensing active device ST is increased, for example, by approximately 0.12 $\mu$A after the touch. The sensing electrode D may view the turn on current difference $\Delta$Ion as the sensing current Is for transmission out to a controller by the read-out line RL. Similarly, by calculating and feeding back a touch coordinate to the display panel, the display frame can be varied correspondingly. Moreover, in the second embodiment, the channel of the sensing active device ST is transformed from a single upper channel before the touch to dual upper and lower channels after the touch. In an actual fabrication process, since the lower channel has less interface defects, therefore, the addition of the lower channel after the touch results in the clear increase of the turn on current Ion. The magnitude of the turn on current Ion for the transistors in FIGS. 7 and 8 is directly related to the design of a ratio of channel width to length (W/L), besides being related to the operating voltage and fabrication capabilities.

In view of the foregoing, the touch-sensing display apparatus in some embodiments of the invention directly fabricates the touch sensing device on the active device array substrate of the display panel and the color filter substrate, and by changing the number of gates for controlling the carrier quantity of the channel in the sensing active device before and after touch, the voltage and current characteristic curve of the sensing active device is altered. Moreover, by using the sensing electrode to detect the sensing current formed by the current difference value, a thin touch-sensing display apparatus integrating touch sensing and display functions can be achieved.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:
1. A touch-sensing display apparatus, comprising:
   a first substrate having a plurality of pixels arranged in array, a plurality of scan lines, a plurality of data lines, and at least a read-out line;
   a second substrate disposed opposite to the first substrate;

a plurality of touch sensing structures disposed between the first substrate and the second substrate, each of the touch sensing structures is disposed in one of M×N pixels, M and N are positive integers, and each of the touch sensing structures comprises:

a sensing active device disposed on the first substrate, the sensing active device comprising a bottom gate, a channel, a source, a sensing electrode, and a top gate, wherein the top gate and the bottom gate are respectively disposed on a top surface and a bottom surface of the channel, the source and the sensing electrode are disposed between the top gate and the channel and respectively located on two sides of the channel, the top gate having an opening to form a first electrode and a second electrode that are electrically isolated, the first electrode is electrically connected to at least one of the scan lines, and the sensing electrode is electrically connected to the read-out line;

a sensing spacer disposed on the second substrate and located above the opening; and a bridge electrode covering a surface of the sensing spacer facing the sensing active device, wherein a spacing exists between the bridge electrode and the top gate, and when the touch-sensing display apparatus is pressed, the bridge electrode contacts the top gate to electrically connect the first electrode with the second electrode, so that control of the channel is transformed from one of the top gate and the bottom gate to both of the top gate and the bottom gate, and a sensing current is formed in the sensing electrode; and a display medium disposed between the first substrate and the second substrate.

2. The touch-sensing display apparatus as claimed in claim 1, wherein the sensing active device has a gate insulating layer and a dielectric layer, the bottom gate is disposed on the first substrate, the channel is disposed on the gate insulating layer above the bottom gate, the dielectric layer covers the source and the sensing electrode, and the top gate covers the dielectric layer.

3. The touch-sensing display apparatus as claimed in claim 1, wherein the opening partially overlaps the channel on a projection direction of the first substrate, the bottom gate extends below the channel from the scan lines, and when the touch-sensing display apparatus is pressed, switching control of the sensing active device is transformed from the bottom gate to both the top gate and the bottom gate, and a turn off current of the sensing active device is increased.

4. The touch-sensing display apparatus as claimed in claim 1, wherein the opening does not overlap the channel on a projection direction of the first substrate, and the bottom gate extends below the channel from the scan lines.

5. The touch-sensing display apparatus as claimed in claim 1, wherein the opening partially overlaps the sensing electrode on a projection direction of the first substrate, the first electrode extends above the source and crosses the channel, the second electrode is electrically connected to the bottom gate, and when the touch-sensing display apparatus is pressed, switching control of the sensing active device is transformed from the top gate to both the top gate and the bottom gate, and a turn on current of the sensing active device is increased.

6. The touch-sensing display apparatus as claimed in claim 1, wherein the opening does not overlap the sensing electrode on a projection direction of the first substrate, the first electrode extends above the source and crosses the channel, and the second electrode is electrically connected to the bottom gate.

7. The touch-sensing display apparatus as claimed in claim 1, wherein the second substrate comprises a color filter layer and a common electrode, the common electrode does not overlap the sensing spacer, the common electrode covers the color filter layer, and a material of the bridge electrode is the same as a material of the common electrode.

8. The touch-sensing display apparatus as claimed in claim 7, wherein the second substrate further comprises a planar layer covering a surface of the color filter layer, the planar layer disposed between the common electrode and the color filter layer, and the sensing spacers and the common electrode are disposed on the planar layer.

9. The touch-sensing display apparatus as claimed in claim 7, wherein the color filter layer covering a surface of second substrate, the sensing spacer and the common electrode are disposed on the color filter layer.

10. The touch-sensing display apparatus as claimed in claim 1, wherein each of the pixels of the first substrate has a pixel electrode electrically connected to the sensing active device.

11. The touch-sensing display apparatus as claimed in claim 1, wherein each of the pixels of the first substrate includes an active device and a pixel electrode, the pixel electrode is electrically connected to the active device, and the sensing active device is different from the active device.

12. The touch-sensing display apparatus as claimed in claim 1, wherein the read-out line is commonly used with at least one of data lines.

13. The touch-sensing display apparatus as claimed in claim 1, wherein the read-out line is different from the data lines.

* * * * *